US008215629B2

(12) United States Patent
Ifkovits et al.

(10) Patent No.: US 8,215,629 B2
(45) Date of Patent: Jul. 10, 2012

(54) SYSTEM AND METHOD FOR PRODUCING AND ARRANGING SHEET MATERIAL FOR USE IN A MAILPIECE INSERTER

(75) Inventors: Michael R. Ifkovits, Danbury, CT (US); Russell W. Holbrook, Southbury, CT (US); Edward M. Ifkovits, New Fairfield, CT (US)

(73) Assignee: Pitney Bowes Inc., Stamford, CT (US)

( * ) Notice: Subject to any disclaimer, the term of this patent is extended or adjusted under 35 U.S.C. 154(b) by 279 days.

(21) Appl. No.: 12/655,508

(22) Filed: Jan. 4, 2010

(65) Prior Publication Data

US 2011/0166695 A1 Jul. 7, 2011

(51) Int. Cl.
*G06F 7/00* (2006.01)

(52) U.S. Cl. ............... 270/58.06; 270/52.02; 270/52.14; 700/220; 700/223

(58) Field of Classification Search ............... 270/58.06, 270/52.02, 52.03, 52.16, 52.14; 700/220, 700/223

See application file for complete search history.

(56) References Cited

U.S. PATENT DOCUMENTS 4,034,973 A * 7/1977 Hams ................................ 493/2
4,972,655 A * 11/1990 Ogawa ............................ 53/155
6,167,326 A * 12/2000 Graushar et al. .............. 700/223
6,747,007 B2 * 6/2004 Hancock et al. .............. 530/324
7,277,772 B2 * 10/2007 Mayer ........................... 700/225
7,477,964 B2 * 1/2009 Graushar et al. .............. 700/223
8,023,935 B2 * 9/2011 Silverbrook et al. ......... 455/418
8,028,981 B2 * 10/2011 Graushar .................. 270/52.03

* cited by examiner

*Primary Examiner* — Patrick Mackey

(74) *Attorney, Agent, or Firm* — Brian A. Collins; Charles R. Malandra, Jr.; Steven J. Shapiro

(57) ABSTRACT

A system and method for producing printed sheet material for use in a mailpiece inserter. The system comprises an input module for supplying the printed sheet material associated with a mailpiece fabrication job of the mailpiece inserter and a transfer module adapted to receive the printed sheet material from the input module and dispense the printed sheet material. An output module is adapted to receive the printed sheet material from the transfer module and convey the printed sheet material along the transport deck. A processor is operatively coupled to a mail run data file of the mailpiece fabrication job for controlling the input, transfer and output modules to stack the printed sheet material in accordance with the mail run data file. In the method, the output module includes at least two transport decks which may be repositioned such that one of the transport decks receives/stacks the printed sheet material in a manner which is best suited for subsequent use by the mailpiece inserter.

17 Claims, 8 Drawing Sheets

SYSTEM AND METHOD FOR PRODUCING AND ARRANGING SHEET MATERIAL FOR USE IN A MAILPIECE INSERTER

FIELD OF THE INVENTION

The present invention relates to a system and method for producing sheet material used in the creation of mailpieces, and more particularly, to a system and method for producing/arranging sheet material for use in a mailpiece inserter which is variable from one mailpiece fabrication job to another, and which may vary in size and/or configuration based upon it subsequent use by the mailpiece inserter.

BACKGROUND OF THE INVENTION

Various apparatus are employed for arranging sheet material in a package suitable for use or sale in commerce. One such apparatus, useful for describing the teachings of the present invention, is a mailpiece inserter system employed in the fabrication of high volume mail communications, e.g., mass mailings. Such mailpiece inserter systems are typically used by organizations such as banks, insurance companies, and utility companies for producing a large volume of specific mail communications where the contents of each mailpiece are directed to a particular addressee. Also, other organizations, such as direct mailers, use mail inserters for producing mass mailings where the contents of each mail piece are substantially identical with respect to each addressee. Examples of inserter systems are the 8 series, 9 series, and APS™ inserter systems available from Pitney Bowes Inc. located in Stamford, Conn., USA.

In many respects, a typical inserter system resembles a manufacturing assembly line. Sheets and other raw materials (i.e., a web of paper stock, enclosures, and envelopes) enter the inserter system as inputs. Various modules or workstations in the inserter system work cooperatively to process the sheets until a finished mail piece is produced. For example, in a mailpiece inserter, an envelope is conveyed downstream utilizing a transport mechanism, such as rollers or a belt, to each of the modules. Such modules include, inter alia, (i) a singulating module for separating a stack of envelopes such that the envelopes are conveyed, one at a time, along the transport path, (ii) a folding module for folding mailpiece content material for subsequent insertion into the envelope, (iii) a chassis module where sheet material and/or inserts, i.e., the content material, are combined to form a collation, (iv) an inserter module which opens an envelope for receipt of the content material, (v) a moistening/sealing module for wetting the flap sealant to close the envelope, (vi) a weighing module for determining the weight of the mailpiece for postage, and (vii) a metering module for printing the postage indicia based upon the weight and/or size of the envelope, i.e., applying evidence of postage on the mailpiece. While these are some of the more commonly used modules for mailpiece creation, it will be appreciated that the particular arrangement and/or need for specialty modules, are dependent upon the needs of the user/customer.

The chassis module includes a transport deck having a plurality of pockets and plurality of overhead feed input stations for dispensing inserts onto each pocket of the transport deck. In the context used herein, "inserts" refers to any sheet material, regardless of size and/or whether folded or unfolded, containing information for inclusion into a mailpiece as content material. In many instances, the inserts are added, by the overhead feed input stations, to sheet material previously supplied, at an upstream input module, to the pockets of the chassis module. Chassis modules may have as many as sixteen (16) to twenty-four (24) feed input stations for supplying each of the underlying pockets with original and/or additional content material. Periodically, these feed input stations must be re-loaded to maintain a steady supply of each type of insert. As a result, there is a continuous need for a re-supply of the various inserts to produce the content material of each mailpiece.

While such inserts are commonly pre-printed and supplied as fixed inputs, i.e., incapable of changing the information provided or configuration of the insert (e.g., folded or unfolded), frequently there is a need to change the information conveyed or change the configuration of the insert. For example, it may be necessary to change the price of a product/service offered, or vary the size of an insert for receipt within a different type of envelope, e.g., envelopes for accepting flats, letter-sized, tri-fold content material. Currently, there are no insert print modules capable of producing and/or arranging a variable supply of content material inserts. Consequently, such changes require that a mailpiece fabricator await the supply of newly printed/configured inserts to produce mailpieces for a particular mail run/job.

A need, therefore, exists for a system and method which facilitates a supply of printed sheet material commensurate with the requirements of a mailpiece inserter and wherein the size and/or configuration of the printed sheet material employed therein may be variable, e.g., folded, unfolded, bi-folded, tri-folded, etc.

SUMMARY OF THE INVENTION

A system and method is provided for producing printed sheet material for use in a mailpiece inserter. The system comprises an input module for supplying the printed sheet material associated with a mailpiece fabrication job of the mailpiece inserter and a transfer module adapted to receive the printed sheet material from the input module and dispense the printed sheet material. An output module is adapted to receive the printed sheet material from the transfer module and convey the printed sheet material along the transport deck. A processor is operatively coupled to a mail run data file of the mailpiece fabrication job for controlling the input, transfer and output modules to stack the printed sheet material in accordance with the mail run data file. In the method, the output module includes at least two transport decks which may be repositioned such that one of the transport decks receives/stacks the printed sheet material in a manner which is best suited for subsequent use by the mailpiece inserter.

BRIEF DESCRIPTION OF THE DRAWINGS

Further details of the present invention are provided in the accompanying drawings, detailed description, and claims.

DETAILED DESCRIPTION

A system and method is described for fabricating sheet material/inserts for a mailpiece inserter. While the system and method are described in the context of an insert fabricating module dedicated to producing printed inserts for a chassis module of a mailpiece inserter, it will be appreciated that the system/method may produce sheet material for any feed input module of the mailpiece inserter such as a sheet input module, a collation input module for a stitcher/stapler module, and/or a feeder for a pamphlet/booklet binding module. Furthermore, while the invention uses the term "insert" to mean sheet material to be added to base content material, received from an upstream processing module of the mailpiece inserter, in the context used herein insert means any sheet material used in the production/processing of a mailpiece. Hence, the terms "insert" and "sheet material" is used interchangeably herein. Furthermore, the insert fabrication module of the present invention may be integrated with the mailpiece inserter to automatically supply the sheet material/inserts rather than requiring an operator to collect the sheet material output and manually re-supply the respective feed input stations, e.g., the overhead feed input stations of the module of the chassis module. The sheet material/insert fabrication module of the present invention is, therefore, merely illustrative of an embodiment of the present invention, and should not be construed as limiting the meaning and scope of the appended claims.

Insert Fabrication Module

Figure 1:
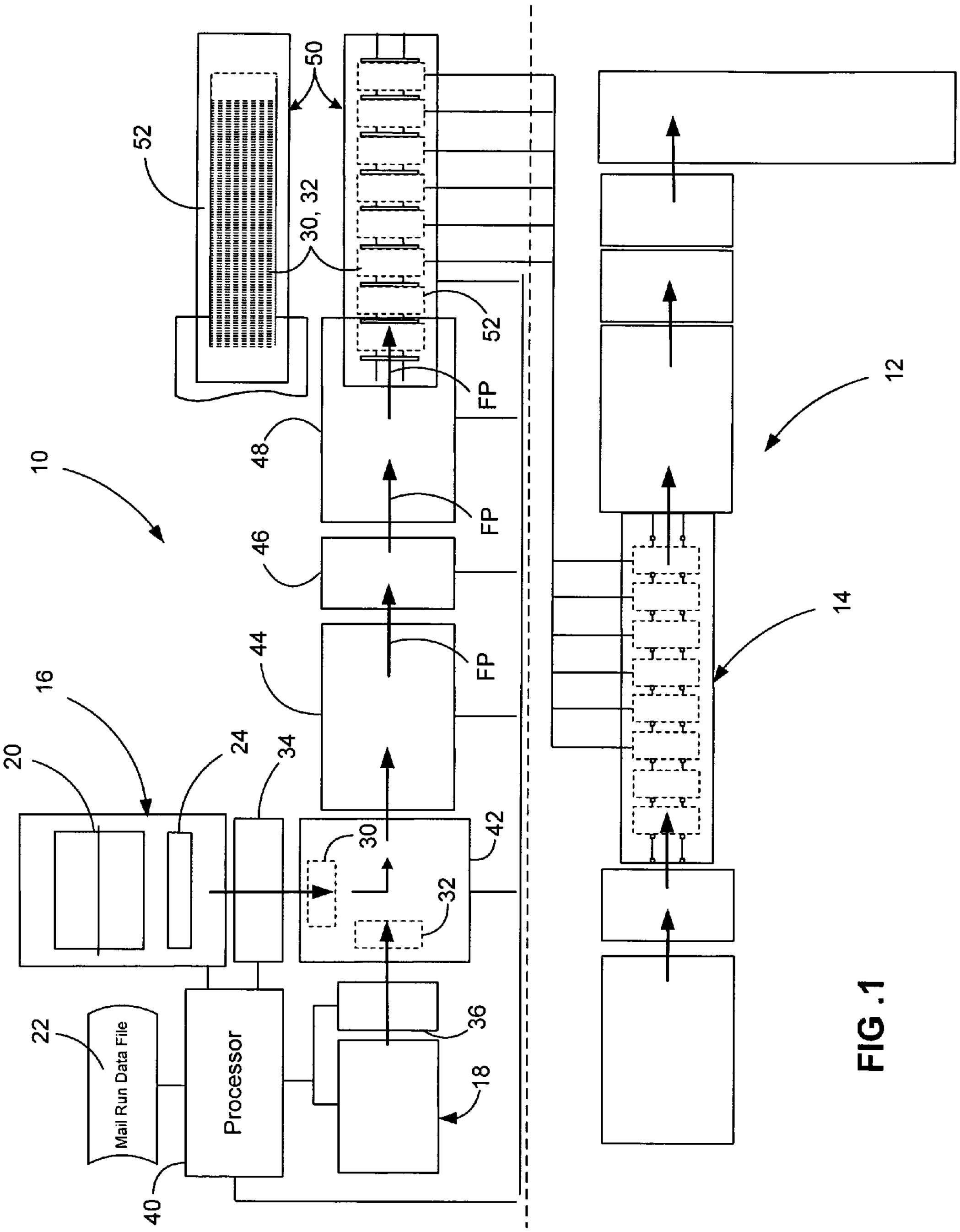
FIG. 1 is a schematic top view of the insert fabricating module according to the present invention for organizing, arranging and conveying the printed sheet material and a schematic top view of a chassis module of a mailpiece inserter for receipt of the printed sheet material.

In FIG. 1, an insert fabricating module 10 is depicted for producing a supply of sheet material inserts for use in a mailpiece inserter 12, e.g., overhead feed input stations (not shown) of the chassis module 14 thereof. The insert fabricating module 10 includes an input module comprising one of a web supply module 16 and a sheet feed module 18. The web supply module 16 may include a rolled web 20 of sheet material which is printed in accordance with a mail run data file 22 associated with a particular mailpiece fabrication job. The rolled web 20 may be processed by a cutting station 24 which produces individual sheets of insert material 30 (along a first feed path FP1) associated with the mailpiece fabrication job. Alternatively, or additionally, the sheet feed module 18 may be integrated with the insert fabricating module 10 to supply a plurality of pre-cut inserts 32 (along a second feed path FP2) which are similarly processed in accordance with the mail run data file 22 associated with the mailpiece fabrication job. Accordingly, the insert material 30, 32 employed in the insert fabricating module 10 of the present invention may be provided by the web supply module 16 or the sheet feed module 18.

To track, organize and arrange insert material 30, 32 based upon the mailpiece fabrication job, scanners 34, 36 may be disposed at the output end of each of the web supply and a sheet feed modules 16, 18. More specifically, the scanners 34, 36 are adapted to read scan codes or other symbology disposed on one or more of the inserts 30, 32, typically within the margins of the printed inserts 30, 32, such that a processor 40, electrically coupled to, and in electronic communication with, the insert fabricating module 10, may determine the number of inserts 30, 32 associated with a particular mailpiece fabrication job or individual mailpiece. The processor 40 is also in communication with, and controls, the other modules of the insert fabricating module 10, i.e., an accumulator module 44, a folder module 46, a transfer module 48, and an output module 50.

Depending upon the origin of each of the inserts 30, 32, i.e., inserts 30 from the web supply module 16, I or inserts 32 from the sheet feed module 18, inserts 30 from the web supply module 16 may be conveyed through a right angle turn module 42 to re-direct the insert material 30, i.e., ninety (90) degrees, to the accumulator module 44. The same right-angle turn module 42 may convey sheet material inserts 32 from the sheet feed module 18, as a straight line input, to the accumulator module 44. The function of the accumulator module 44 is conventional and will not be described in greater detail herein. Suffice it to say that the accumulator module 44 may be employed to combine the insert material 30, 32 into packets of content material for use in the fabrication of an individual mailpiece, i.e., a collation of sheets, or simply as a buffer to accumulate a predetermined number of sheets.

Depending upon the end-use of the sheet material inserts 30, 32, a folder module 46 may be interposed between the accumulator module 44 and the transfer module 48 to fold the insert material 30, 32, or transfer/pass the insert material 30, 32 without being folded. Therein, the inserts 30, 32, whether stacked into a collation or processed as an individual sheet from the accumulator module 44, may be bi-folded, tri-folded or gate-folded, such that the inserts 30, 32 may be placed into a particular size envelope, e.g., a type ten (10) envelope. Alternatively, the inserts 30, 32 may be transferred directly, without being folded for inclusion into another type of envelope, e.g., a flats-type envelope.

Figure 2:
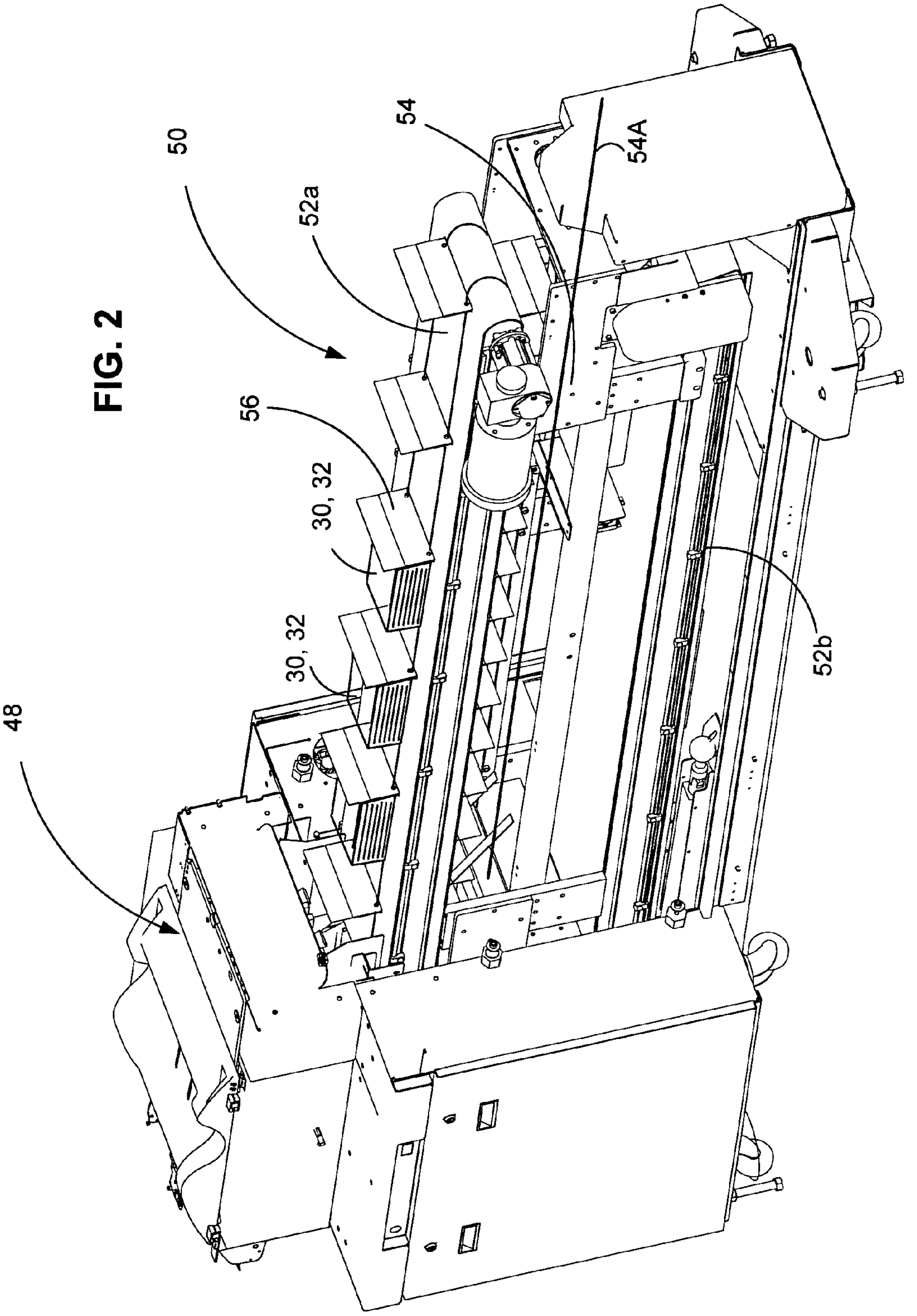
FIG. 2 is an isolated perspective view of an output module having at least two transport decks disposed in combination with a rotating support structure and adapted to receive printed sheet material from a transfer module of the insert fabricating module depending upon a selected operating mode thereof.

In FIGS. 1 and 2, the transfer module 48 conveys the sheet material inserts 30, 32 from the folder module 46 to the output module 50 of the insert fabrication module 10. Furthermore, the transfer module 48 is controlled by the processor 40 to dispense a pre-determined number of inserts 30, 32 onto at least one of two transport or conveyor decks 52*a*, 52*b* of the output module 50. Once again, the number of sheet material inserts 30, 32 is a function of that prescribed by the mail run data file of the mailpiece fabrication job. For example, if a mailpiece fabrication job requires that two-thousand (2,000) inserts of a total of five thousand (5,000) inserts be folded, then the folder and transfer modules 46, 48 may be commanded, by the processor 40, to dispense four (4) stacks of five-hundred (500) folded sheet material inserts 30, 32 onto a transport deck 52.

The transfer module 48 receives the sheet material inserts 30, 32, from the folding module 46 and conveys the sheet material 30, 32 to the output module 50 along a feed path FP. The transfer and output modules 48, 50 are operative to arrange, stack, and convey the sheet material inserts 30, 32 in a manner consistent/commensurate with the inserts employed in connection with the mailpiece fabrication job.

Figure 3:
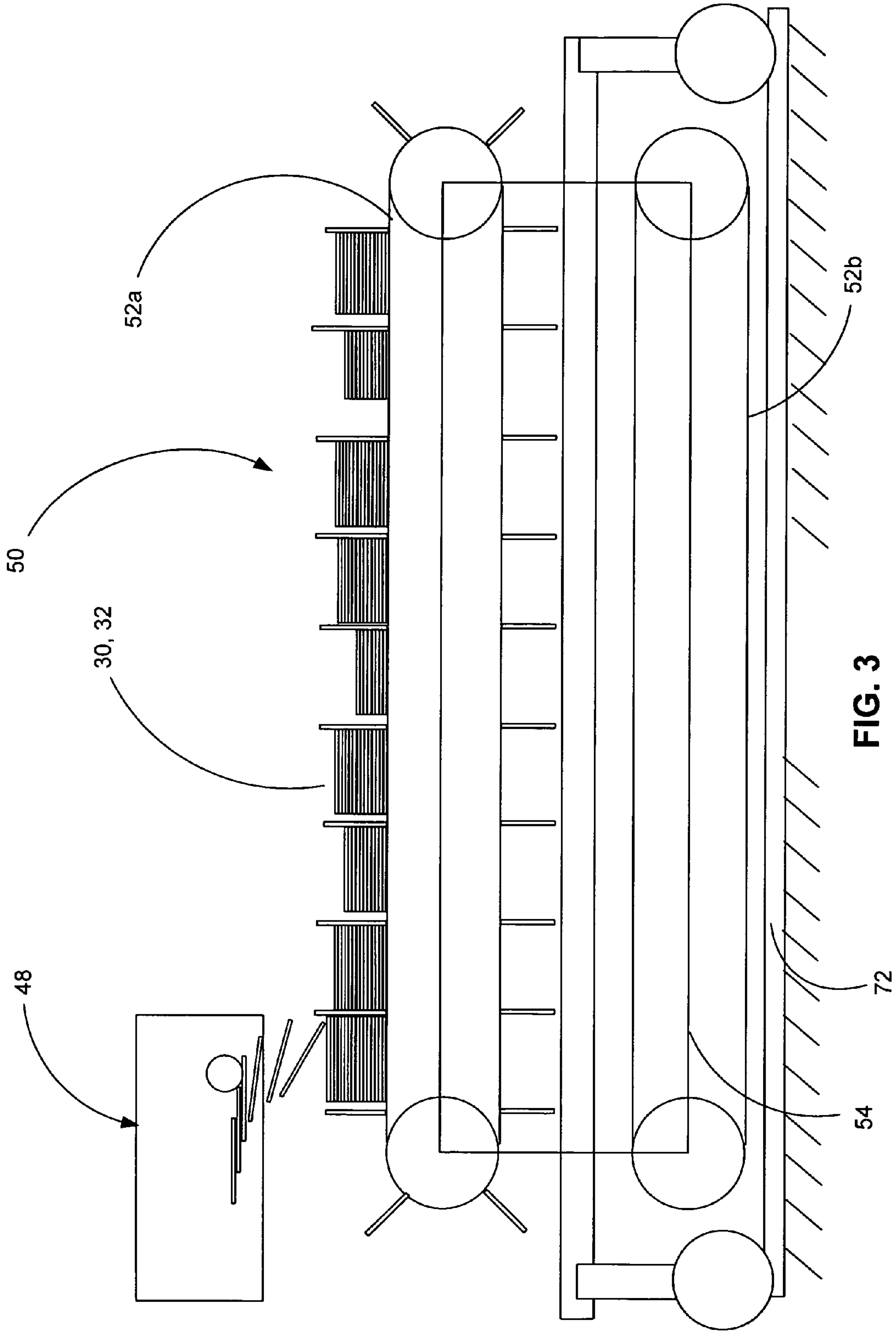
FIG. 3 is a side profile view of the output module wherein one of the transport decks of the output module includes a plurality of separators defining a pocket for receipt of one or more stacks of sheet material from a transfer module, and the other of the transport decks is adapted to receive a shingled stack of printed sheet material from the transfer module.
Figure 4:
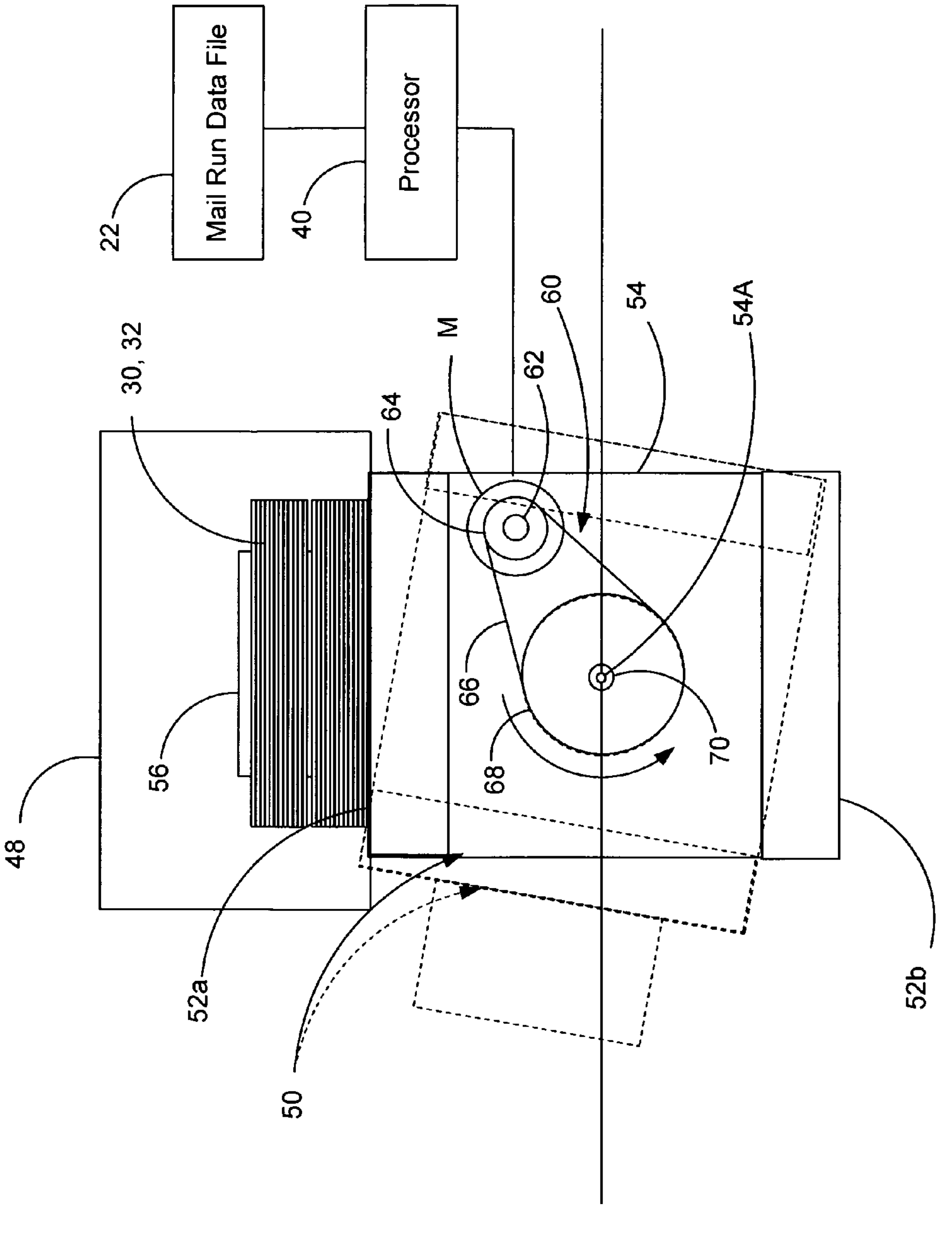
FIG. 4 is a front view of the output module wherein an actuator rotates the support structure about a rotational axis to vary which of the transport decks receives the printed sheet material based upon the selected operating mode.
Figure 5:
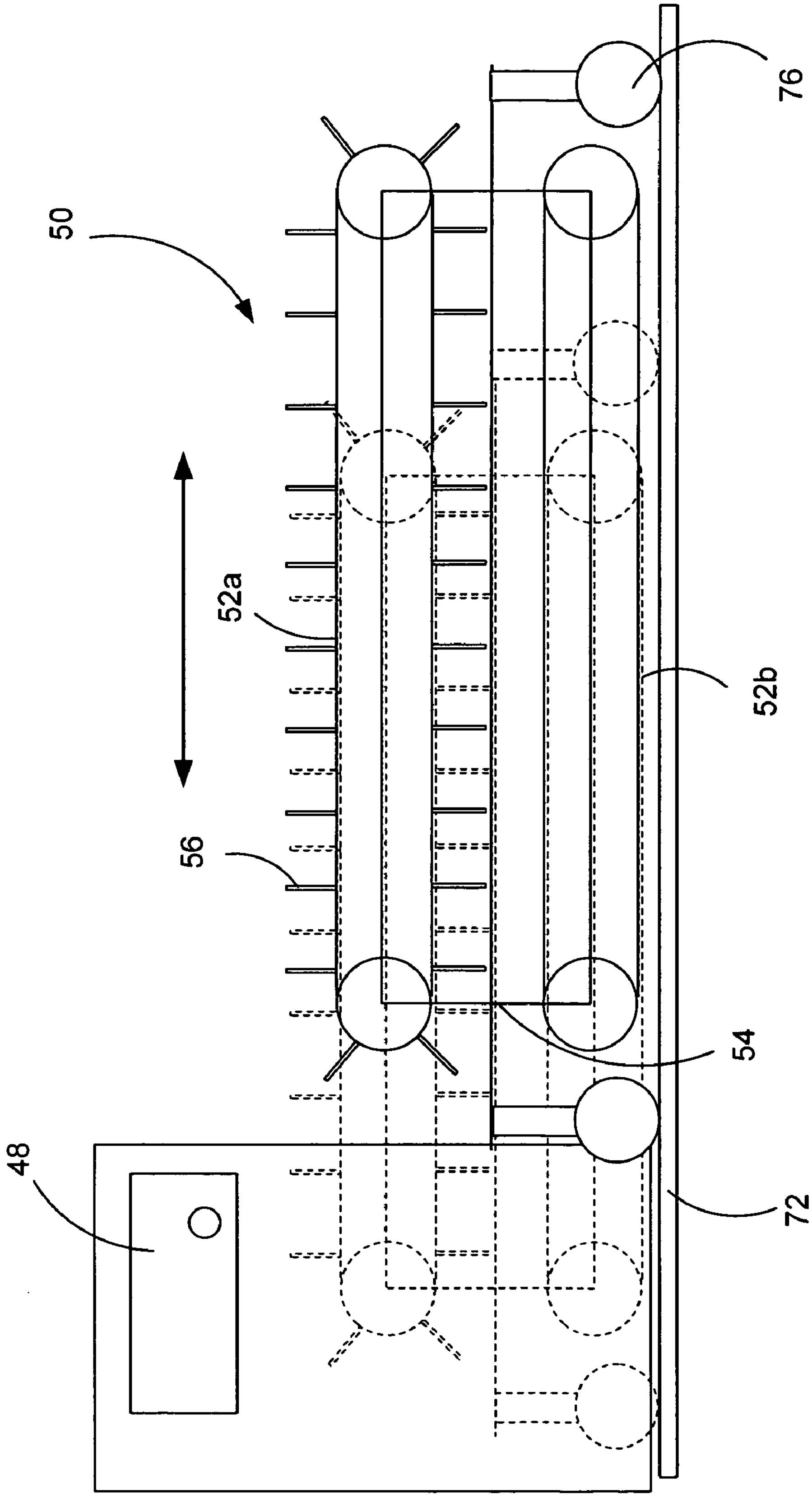
FIG. 5 is a side profile view of the output module wherein support structure is extended and retracted (depicted in solid and dashed lines, respectively) such that the appropriate transport deck may rotated into a position corresponding to the selected operating mode.
Figure 6:
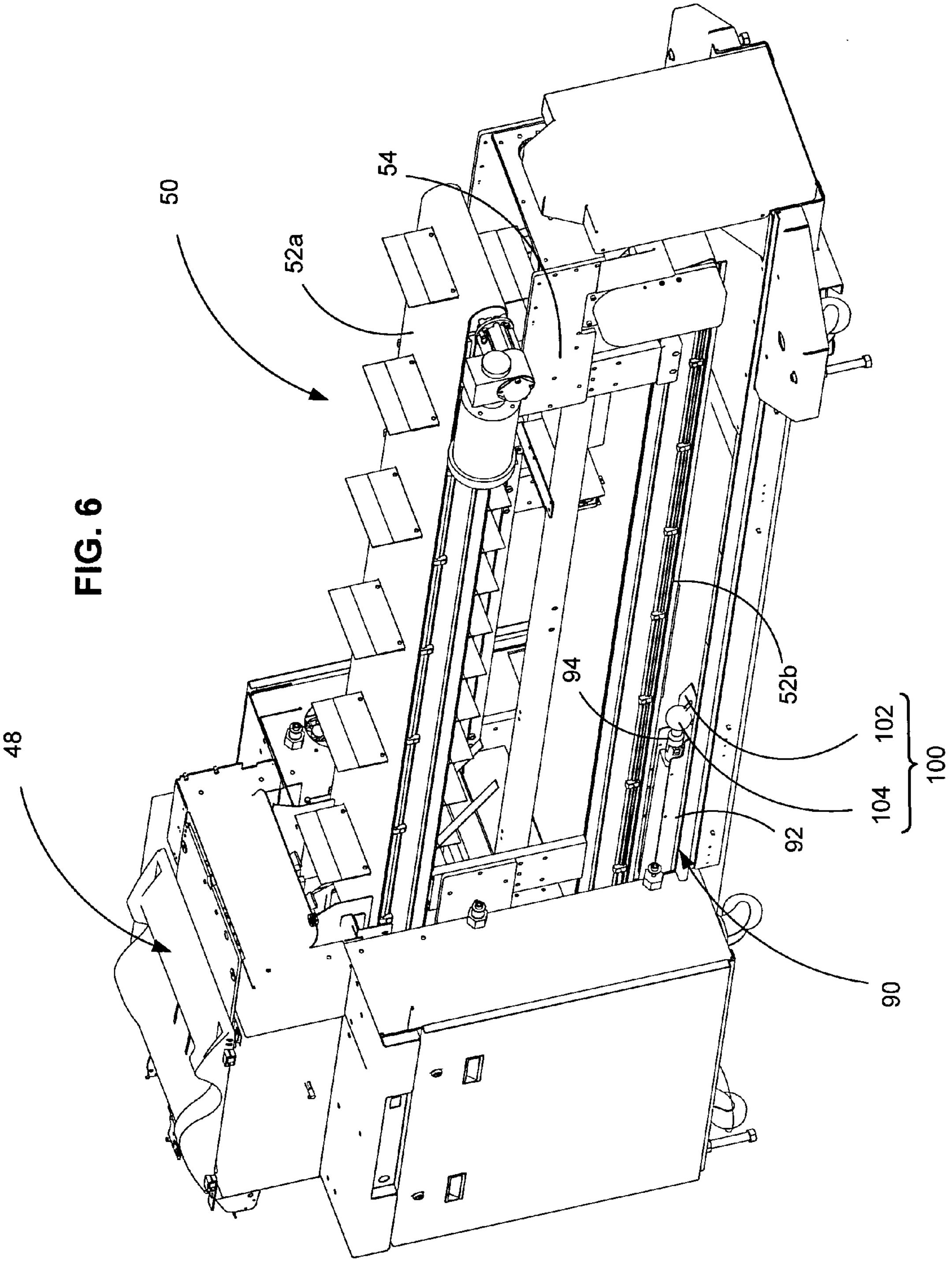
FIG. 6 is an isolated perspective view of the output module including a safety device for extending and retracting the support structure and wherein the safety device prevents operator injury due to the relative displacement of structural elements, e.g., the extended and retracted positions of the support structure.
Figure 7A:
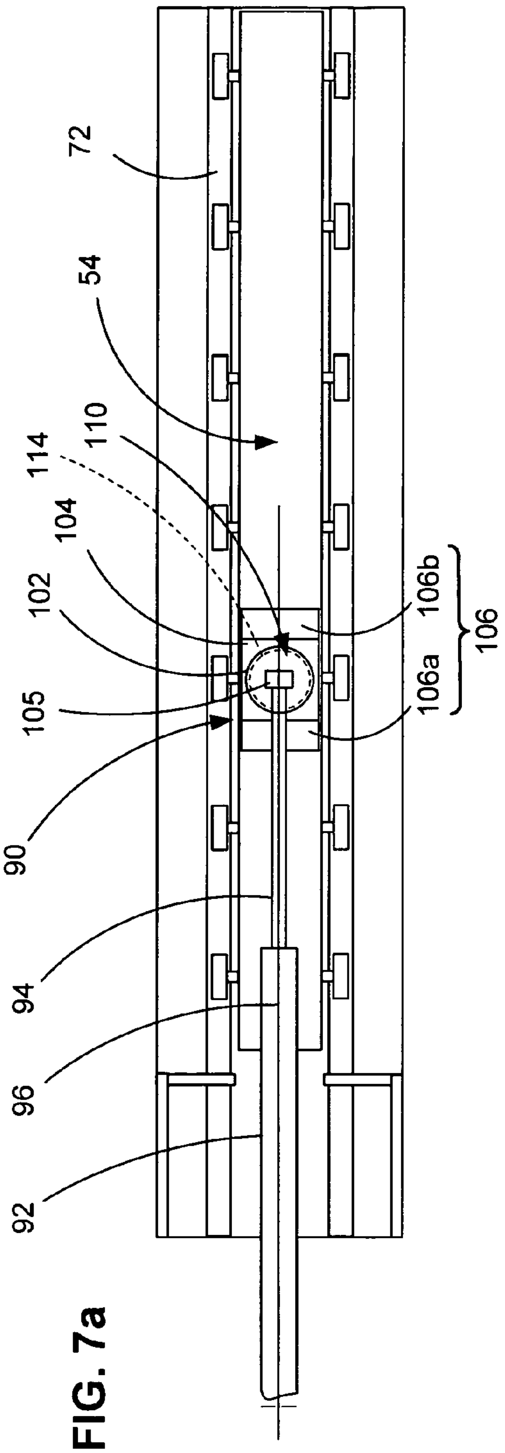
FIG. 7*a* depicts a view taken substantially along line 7*a*-7*a* of FIG. 6 depicting the safety device in a coupled operating mode wherein one of the structural elements, e.g., the support structure, is extended relative to another of the structural elements, e.g., the transfer module.
Figure 7B:
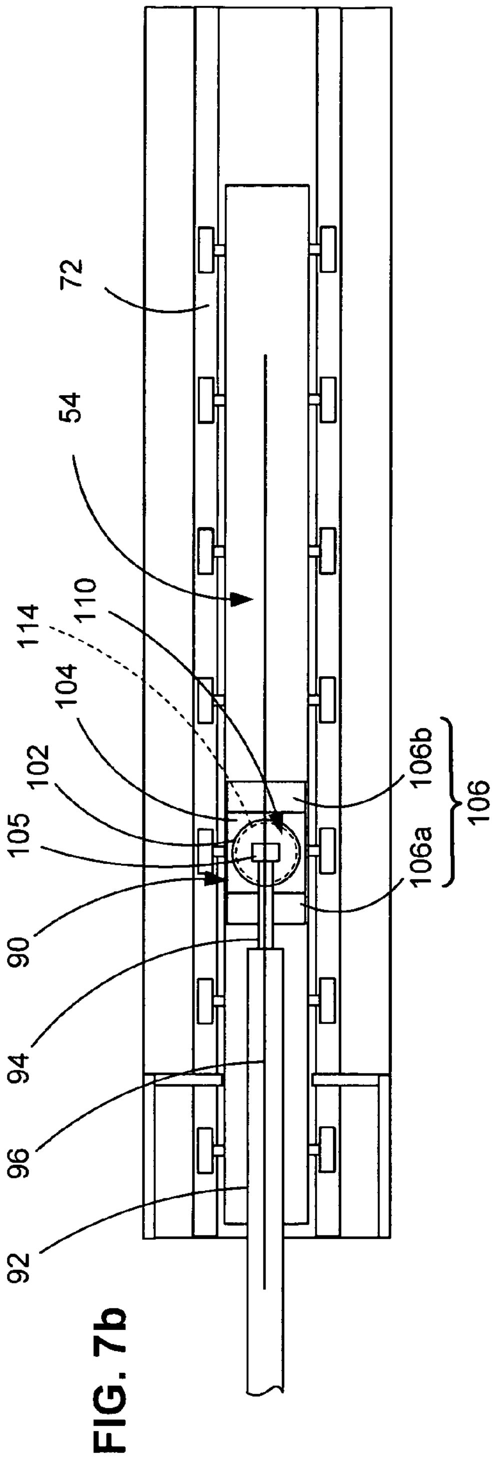
FIG. 7*b* depicts a view taken substantially along line 7*b*-7*b* of FIG. 6 depicting the safety device in a coupled operating mode wherein one of the structural elements, e.g., the support structure, is retracted relative to another of the structural elements, e.g., the transfer module.

In the described embodiment, and referring to FIGS. 2, 3 and 4, the output module 50 includes a support structure 54 which rotates about an axis 54A and at least two transport decks 52*a*, 52*b* disposed in combination with the support structure 54. The processor 40 receives input from the mail run data file 22 to determine which of the transport decks 52*a*, 52*b* is best suited to receive the sheet material inserts 30, 32, i.e. based upon the size and/or configuration thereof to be used in the mailpiece inserter 12. While the transport decks 52*a*, 52*b* may be adapted to receive any of a variety of stacked sheet material inserts 30, 32, in the described embodiment, one of the transport decks 52*a*, 52*b* includes a plurality of separators 56 for receiving stacks of sheet material inserts 30, 32 while another includes a flat conveyor belt 58 for receiving a shingled stack of sheet material inserts 30, 32. With respect to the transport deck 52*a*, the separators 56 define pockets which function to separate stacks of printed sheet material inserts 30, 32. Furthermore, the separators 56 register an edge of each stack while the sheet material 30, 32 is deposited between the separators 56.

More specifically, the support structure 54 of the output module 50 includes an actuator 60 for rotating the support structure 54 about its rotational axis 54A. As mentioned previously, the processor 40 issues command signals to the output module 50 to rotate the support structure 54 such that the appropriate one of the transport decks 52*a*, 52*b* is aligned with, and receives, the printed sheet material inserts 30, 32 from the transfer module 48. In the described embodiment, a motor M, responsive to input from the processor 40, drives a rotating shaft 62 having a first gear 64 connecting to and rotating with the shaft 62. A belt or chain 66 wraps around and engages the first gear 64 to drive a second gear 68 which, in turn, drives a shaft 70. The shaft 70 is coupled to, and drives, the support structure 54 of the output module 50, about the axis 54A. The processor 40, therefore, drives the rotation, and position of, the output module 50, based upon the selected operating mode of the insert fabrication module 10, i.e., whether the insert fabrication module 10 is to receive and arrange the sheet material inserts 30, 32 as stacks of content material, or as a continuous stack of shingled sheet material 30, 32.

To rotate the support structure 54, it may be necessary to extend the transport decks 52*a*, 52*b* beyond the transfer module 48 such that output module 50 clears any structure/elements which may interfere with rotation of the support structure 54 associated with the transfer module 48. Consequently, the output module 50 may be is adapted to extend/retract relative to the transfer module 48 to facilitate integration of the transfer and output modules 48, 50. Accordingly, in the described embodiment, and referring to FIGS. 5, 6, 7*a* and 7*b*, the support structure 54 is mounted within guide rails/tracks 72 of a stationary structure 74 to extend and retract the support structure 54 of the output module 50 relative to the transfer module 48. In the described embodiment, the tracks 72 are stationary and the support structure 54 is mounted, and guided within, the tracks 72 by a plurality of rolling elements 76. A linear actuator 90, mounted at one end of the stationary structure 74, effects relative displacement between the structural elements, i.e., between the stationary structure 78 of the insert fabrication module 10 and the support structure 54 of the output module 50. The support structure 54 is shown in an extended position to facilitate rotation of the output module 50, i.e., the support structure 54 and transport decks 52*a*, 52*b*, about the rotational axis 54A.

While the insert fabrication module 10 of the present invention has been described as including a plurality of modules upstream of the output module 50 to process the sheet material/inserts 30, 32, it will be appreciated that certain of the modules may be eliminated to reduce cost or minimize the size envelope of the fabrication module 10. For example, the right angle turn module 42 may be eliminated should the insert fabrication module 10 receive an in-line, straight, input from either the web supply module 16 or the sheet feeder module 18. Additionally, the accumulator module 44 may be eliminated if the transfer module 46 is adapted to receive the input directly from one of the input modules, i.e., the web supply or sheet feed modules 16, 18. That is, the accumulator module 44 may be eliminated if the transfer module is adapted to handle the throughput or output of one of the input modules 16, 18 directly, without the need to accumulate or buffer the sheet material/inserts at an upstream station.

Safety Device for Automated Fabrication Equipment

Inasmuch as the insert fabrication system 10 of the present invention requires that the linear actuation device 90 be employed to extend/retract the support structure 54, a safety device 100, shown in FIGS. 7*a* through 8*c*, is provided to ensure operator safety when operating the insert fabrication module 10. In the described embodiment, the linear actuation device 90 includes an actuation cylinder 92 and an actuation shaft 94 disposed in combination with the cylinder 92 which moves relative thereto along a line of motion, i.e., the longitudinal axis 96 of the shaft 94. The safety device 100 employed in the insert fabrication system 10 may be used in any linear actuation device which employs moving parts, i.e., those which are capable of inflicting injury to an operator by the relative displacement of structural elements (e.g., trapping a finger/limb between moving elements). The safety device 100 employs a spring-biased base plate 102 and a spherical element 104 disposed in combination with the spring-biased base plate 102 which engages and disengages based upon a threshold level of applied force. Hence, the safety device 100 operates in a coupled operating mode and transitions to a safe operating mode, i.e., wherein the spherical element 104 disengages the base plate 102.

In the described embodiment, the spherical element 104 is disposed in combination with the end of the shaft 94 and is mounted by a bearing 105 which permits relative rotation about the longitudinal axis 96 of the shaft 94. As a result, the spherical element 104 is capable of rotation in a plane orthogonal to the longitudinal axis 96 of the shaft 94. Furthermore, in the described embodiment, the spherical element 104 defines a diameter greater than about one (1) inches.

Figure 8A:
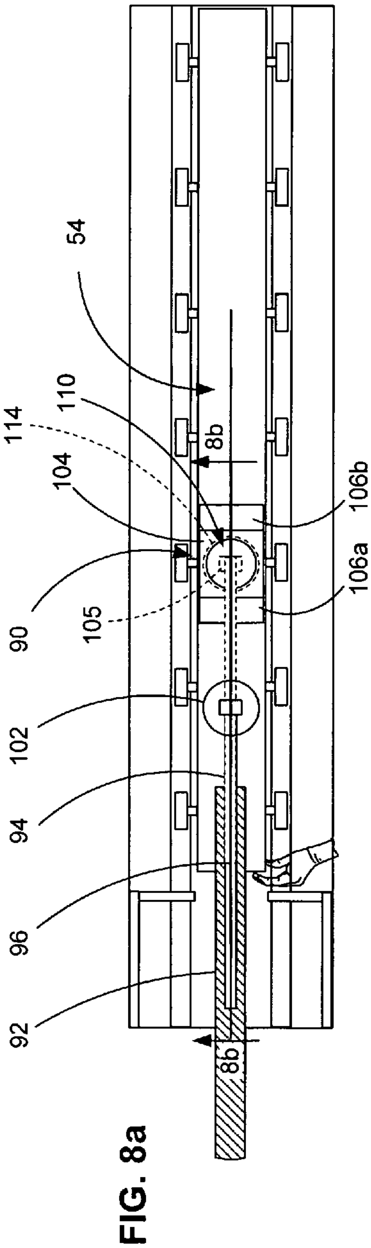
FIG. 8*a* depicts a view taken substantially along line 8*a*-8*a* of FIG. 6 depicting the safety device in a coupled operating mode (shown in dashed lines) and in a safe operating mode (shown in solid lines).
Figure 8B:
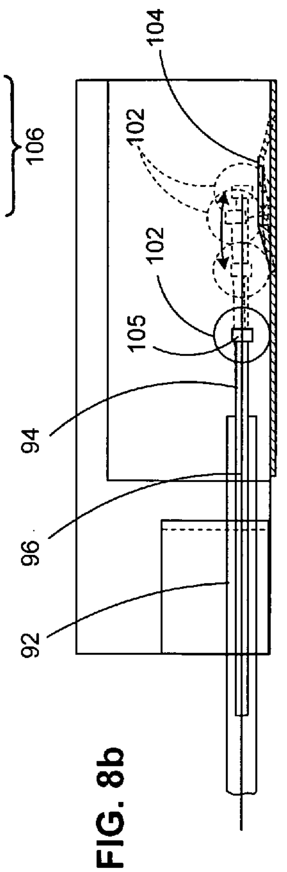
FIG. 8*b* depicts a view taken substantially along line 8*b*-8*b* of FIG. 8*a* depicting a cross-sectional view of the safety device including a base plate having first and second spring elements which deflect in response to a vertical force component imposed by a spherical element thereby engaging and disengaging the base plate, i.e., the coupled and safe operating modes, respectively.
Figure 8C:
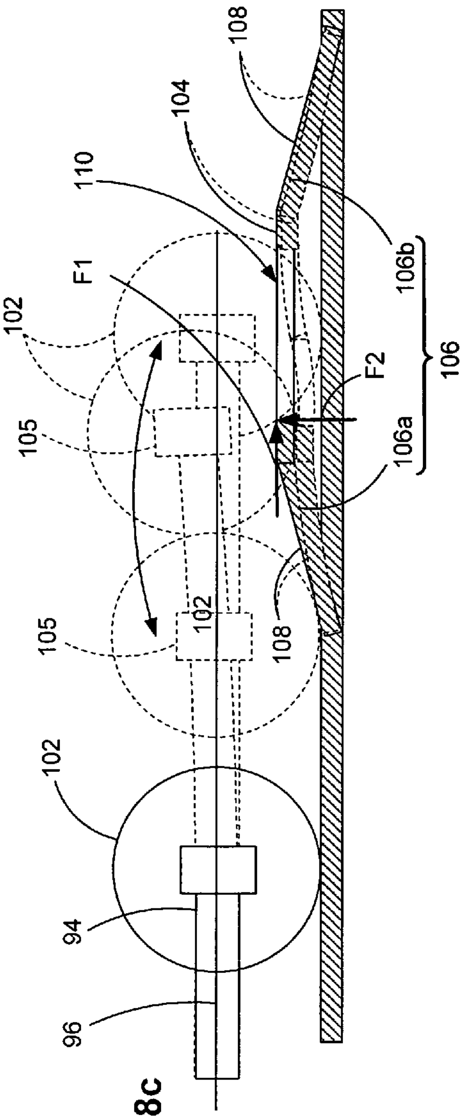
FIG. 8*c* depicts an enlarged view of the safety device shown in FIG. 8*b* depicting the engagement/disengagement of the spherical element from the base plate based upon the vertical force component imposed by the spherical element.

The base plate 102, best seen in FIG. 8*c*, includes at least one spring element 106 projecting downwardly from the base plate 102 and includes an aperture 110 therein having a peripheral edge 114. While the spring element 106 may include a single Belleville-type spring element, i.e., one or more spring elements disposed about a central circular-shaped structure, the base plate 102 of the present invention includes first and second spring elements 106*a*, 106*b*, disposed forward and aft relative to the longitudinal axis 96 of the spherical element 104. The first and second spring elements 106*a*, 106*b* include ramped surfaces 108 which define an angle within a range of between about ten (10) degrees and about forty (40) degrees relative to a horizontal plane HP. Preferably, the ramped surfaces 108 (see FIG. 8*c*) define an angle within a range of between about fifteen (15) degrees and about thirty (30) degrees relative to the horizontal plane.

In operation, the safety device 100, i.e., the spherical element 104, imposes a threshold horizontal force component F1 to the base plate 102 to effect relative displacement between the structural elements, i.e., between the stationary structure 68 of the insert fabrication module 10 and the support structure 54 of the output module 50. Consequently, the linear actuation device 100 displaces the elements to extend/retract the support structure 54 of the output module 50, i.e., to facilitate rotation and repositioning of the transport decks 52*a*, 52*b*. Should an object or operator appendage be inadvertently disposed between the moving elements, spring elements 106*a*, 106*b* deflect downwardly, due to a vertical force component F2 imposed by the spherical element 104 and produced by the horizontal force component F1. In the described embodiment, the threshold horizontal force F1 component is less than about twenty-five (25) pounds, and, more preferably, is less than about seventeen (17) pounds.

It is to be understood that the present invention is not to be considered as limited to the specific embodiments described above and shown in the accompanying drawings. The illustrations merely show the best mode presently contemplated for carrying out the invention, and which is susceptible to such changes as may be obvious to one skilled in the art. The invention is intended to cover all such variations, modifications and equivalents thereof as may be deemed to be within the scope of the claims appended hereto.

What is claimed is:

1. A system for producing printed sheet material for a mailpiece inserter; comprising:

an input module for supplying the printed sheet material associated with a mailpiece fabrication job;

a transfer module adapted to receive the printed sheet material from the input module and dispense the printed sheet material;

an output module adapted to receive the printed sheet material from the transfer module and convey the printed sheet material along a feed path, the output module including a support structure adapted to rotate about an axis substantially parallel to the feed path of the printed sheet material, an actuator for rotating the support structure about the axis, and at least two transport decks disposed in combination with the rotating support structure, each of the transport decks adapted to receive printed sheet material from the transfer module depending upon a selected operating mode, and a processor, operatively coupled to a mail run data file of the mailpiece fabrication job for controlling the input, transfer and output modules to stack the printed sheet material in accordance with the mail run data file.

2. The system according to claim 1 wherein the input module includes one of a web supply module and a sheet feed module.

3. The system according to claim 1 wherein the transfer module dispenses printed sheet material onto one of the transport decks in accordance with the mail run data file associated with the mailpiece fabrication job.

4. The system according to claim 1 wherein one of the transport decks of the output module is adapted to receive a shingled stack of printed sheet material from the transfer module.

5. The system according to claim 1 wherein one of the transport decks of the output module includes a plurality of separators each projecting substantially orthogonally of the transport deck, and wherein a pair of separators define a pocket for receipt of the printed sheet material.

6. The system according to claim 1 wherein one of the transport decks is adapted to receive a shingled stack of printed sheet material from the transfer module in one of the selected operating modes, and another of the transport decks is adapted to receive stacks of printed sheet material in another of the selected operating modes.

7. The system according to claim 6 wherein one of the transport decks is adapted to receive stacks of printed sheet material includes a plurality of separators each projecting substantially orthogonally of the transport deck and wherein a pair of separators defines a pocket for receipt of the printed sheet material.

8. The system according to claim 1 further comprising:

a linear actuation device for extending and retracting the support structure of the output module relative to the transfer module in a direction substantially parallel to the rotational axis of the support structure;

the linear actuation device extending the support structure to an extended position such that the transport decks may rotated to a position corresponding to the selected operating mode and retracting the support structure to a retracted position to such that the transport deck may receive the printed sheet material from the transfer module.

9. The system according to claim 1 further comprising:

an accumulator module, receiving the printed sheet material from the input module, and accumulating printed sheet material associated with one of the feed input modules of a the mailpiece inserter.

10. A method for producing printed sheet material for use in a mailpiece inserter, comprising the steps of:

selecting one of at least two operating modes associated with processing the printed sheet material in accordance with a mailpiece fabrication job of the mailpiece inserter, in one operating mode, the sheet material being folded, and, in another operating mode, the sheet material being unfolded;

adapting an output module of the sheet processing system to receive the sheet material onto one of at least two transport decks, and to receive the printed sheet material as one of (i) a shingled stack of sheet material, and (ii) at least one stack of printed sheet material;

feeding the printed sheet material associated with the mailpiece fabrication job, the sheet material including printed characters/symbology providing information associated with processing of the sheet material;

reading the printed characters/symbology to obtain information necessary for accumulating and stacking the printed sheet material onto a transport deck; and processing the printed sheet material through at least one of a series of processing modules including one of (i) an accumulating module, (ii) a folding module and (iii) a transfer module; and receiving the printed sheet material from the at least one of a series of processing modules onto one of the at least two transport decks in accordance with the selected operating mode.

11. The method according to claim 10 wherein the step of processing the printed sheet material through at least one of a series of processing modules includes the step of accumulating the printed sheet material into a group associated with the content material of an individual mailpiece.

12. The method according to claim 10 wherein the step of processing the printed sheet material through at least one of a series of processing modules includes the step of accumulating the printed sheet material into a group having common content material.

13. The method according to claim 10 wherein the step of processing the printed sheet material through at least one of a series of processing modules includes the step of accumulating the printed sheet material into groups which are separated based upon a threshold number of accumulated sheets.

14. The method according to claim 10 wherein the step of processing the printed sheet material through at least one of a series of processing modules includes the step of accumulating the printed sheet material into groups having a common fold configuration.

15. The method according to claim 10 wherein the step of processing the printed sheet material through at least one of a series of processing modules includes the step of accumulating the printed sheet material into groups having a common size.

16. The method according to claim 10 wherein the step of adapting the output module of the sheet processing system includes the step of partitioning at least one of the transport decks into a plurality of pockets, each pocket receiving a stack of printed sheet material.

17. The method according to claim 16 wherein the step of partitioning at least one of the transport decks includes the step of varying the dimension of at least two pockets to receive stacks having a variable width dimension.

* * * * *